United States Patent
Kim et al.

(10) Patent No.: US 9,099,082 B2
(45) Date of Patent: Aug. 4, 2015

(54) APPARATUS FOR CORRECTING ERROR IN SPEECH RECOGNITION

(71) Applicant: GWANGJU INSTITUTE OF SCIENCE AND TECHNOLOGY, Gwangju (KR)

(72) Inventors: Hong-Kook Kim, Gwangju (KR); Woo-Kyeong Seong, Gwangju (KR); Ji-Hun Park, Gwangju (KR)

(73) Assignee: Gwangju Institute of Science and Technology, Gwanju (KR)

( * ) Notice: Subject to any disclaimer, the term of this patent is extended or adjusted under 35 U.S.C. 154(b) by 258 days.

(21) Appl. No.: 13/896,073

(22) Filed: May 16, 2013

(65) Prior Publication Data

US 2013/0311182 A1   Nov. 21, 2013

Related U.S. Application Data

(60) Provisional application No. 61/647,521, filed on May 16, 2012.

(51) Int. Cl.
*G10L 15/00* (2013.01)
*G10L 15/04* (2013.01)
*G10L 15/187* (2013.01)

(52) U.S. Cl.
CPC ............... *G10L 15/04* (2013.01); *G10L 15/187* (2013.01)

(58) Field of Classification Search
USPC ........................................................ 704/240
See application file for complete search history.

(56) References Cited

U.S. PATENT DOCUMENTS 8,209,182 B2 *   6/2012  Narayanan ................. 704/270
2003/0055641 A1   3/2003  Yi et al.

FOREIGN PATENT DOCUMENTS

JP           2011-113043 A      6/2011

OTHER PUBLICATIONS

Seong et al., Performance Improvement of Dysarthric Speech Recognition Using Context-Dependent Pronounciation Variation Modeling Based on Kullback-Leibler Distance, Aug. 2012, Advance Science and Technology Letters vol. 14, No. 1, pp. 53-56.*
Notice of Allowance dated May 1, 2014 in Korean Application No. 10-2013-0053661.

* cited by examiner

*Primary Examiner* — Barbara Reinier
(74) *Attorney, Agent, or Firm* — Saliwanchik, Lloyd & Eisenschenk

(57) ABSTRACT

An apparatus for correcting errors in speech recognition is provided. The apparatus includes a feature vector extracting unit extracting feature vectors from a received speech. A speech recognizing unit recognizes the received speech as a word sequence on the basis of the extracted feature vectors. A phoneme weighted finite state transducer (WFST)-based converting unit converts the recognized word sequence recognized by the speech recognizing unit into a phoneme WFST. A speech recognition error correcting unit corrects errors in the converted phoneme WFST. The speech recognition error correcting unit includes a WFST synthesizing unit modeling a phoneme WFST transferred from the phoneme WFST-based converting unit as pronunciation variation on the basis of a Kullback-Leibler (KL) distance matrix.

9 Claims, 6 Drawing Sheets

APPARATUS FOR CORRECTING ERROR IN SPEECH RECOGNITION

CROSS-REFERENCE TO RELATED APPLICATION

This application claims the benefit of U.S. Provisional Application Ser. No. 61/647,521, filed May 16, 2012, which is hereby incorporated by reference in its entirety.

BACKGROUND

The present disclosure relates to an apparatus for correcting an error in speech recognition.

Dysarthric speakers have difficulty in respiration, vocalization, and articulation due to defects in nervous system which controls the articulatory organs. Due to this, a dysarthric speech has inexact articulation such as omission, substitution, distortion, or the like of a specific phoneme. This inexact articulation results in degradation of recognition performance in a speech recognition system.

In order to solve this problem, pronunciation variation is modeled and an error correction method on the basis of the model is being researched.

BRIEF SUMMARY

Embodiments provide apparatuses for enhancing a recognition rate for dysarthric speakers, and apparatus for enhancing recognition rates for non-dysarthric speakers as well as dysarthric speakers.

Embodiments also provide methods of modeling pronunciation variation of speech through a Kullback-Leibler (KL) distance matrix and correcting errors on the basis of the model.

In one embodiment, an apparatus for correcting errors in speech recognition, the apparatus comprises: a feature vector extracting unit extracting feature vectors from a received speech; a speech recognizing unit recognizing the received speech as a word sequence on the basis of the extracted feature vectors; a phoneme weighted finite state transducer (WFST)-based converting unit converting the recognized word sequence recognized by the speech recognizing unit into a phoneme WFST; and a speech recognition error correcting unit correcting errors in the converted phoneme WFST, wherein the speech recognition error correcting unit comprises a WFST synthesizing unit modeling a phoneme WFST transferred from the phoneme WFST-based converting unit as pronunciation variation on the basis of a Kullback-Leibler (KL) distance matrix.

The details of one or more embodiments are set forth in the accompanying drawings and the description below. Other features will be apparent from the description and drawings, and from the claims.

DETAILED DESCRIPTION

Reference will now be made in detail to the embodiments of the present disclosure, examples of which are illustrated in the accompanying drawings.

An apparatus for correcting an error in speech recognition according to an embodiment will be described in detail with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

Figure 1:
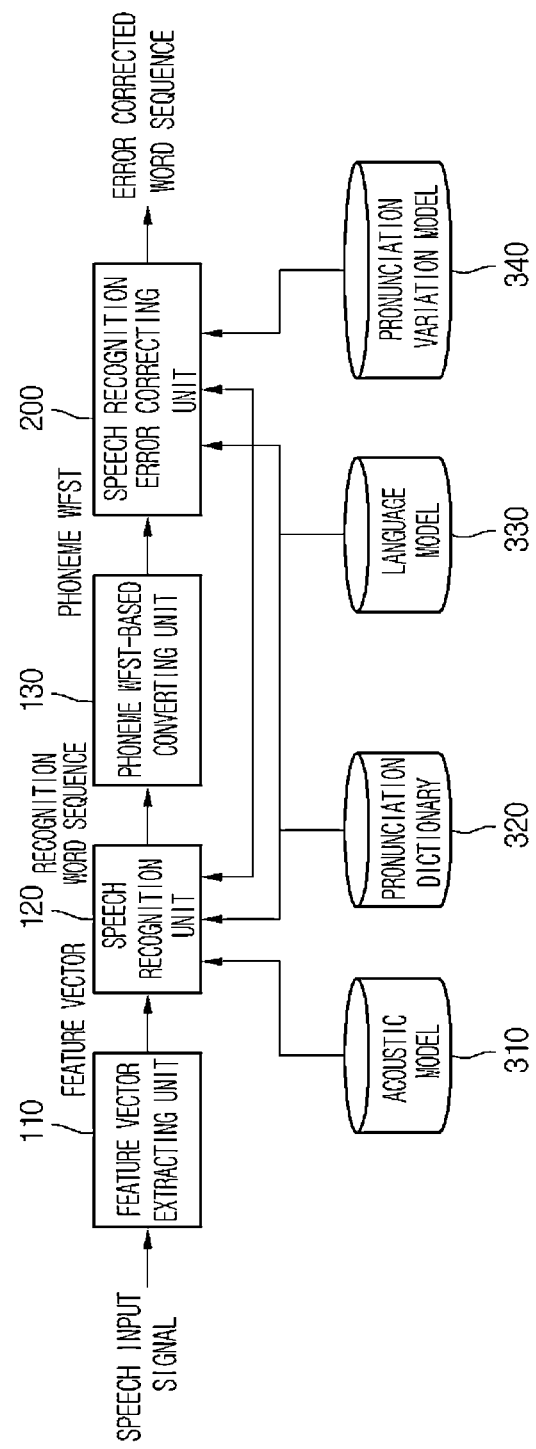
FIG. 1 is a block diagram illustrating an entire configuration of an apparatus for correcting an error in speech recognition according to embodiments.

FIG. 1 is a block diagram illustrating an entire configuration of an apparatus for correcting an error in speech recognition according to embodiments.

Referring to FIG. 1, the apparatus according to embodiments includes a feature vector extracting unit 110 for extracting feature vectors from a received speech signal, a speech recognizing unit 120 for recognizing the received speech signal as a word sequence on the basis of the extracted feature vector, a phoneme weighted finite state transducer (WFST)-based converting unit 130 for converting the word sequence recognized by the speech recognizing unit 120 into a phoneme WFST, and a speech recognition error correcting unit 200 for correcting an error in the phoneme WFST.

And at least one database may be further included, which may be referred to during word sequence recognition by the speech recognizing unit 120 and error correction in phonemes by the speech recognition error correcting unit 200. The database may include an acoustic model 310, a pronunciation dictionary 320, a language model 330, and a pronunciation variation model 340. In particular, the pronunciation variation model 340 is based on a Kullback-Leibler (KL) distance matrix, and detailed description thereon will be described later.

In detail, the feature vector extracting unit 110 plays a role of giving features to the received speech signal. The feature vector extraction is performed by extracting features valid to recognition from an uttered speech in speech recognition. For example, a speech waveform may be subdivided at each 20 msec to create a frame, each frame being overlapped at every 10 msec to be moved. For each frame, feature vectors may be extracted by converting a time domain signal into a frequency domain signal. At this time, the frequency domain signal is converted into mel-frequency bands, which reflect a way that human ears analyze speech, and then cesptum is extracted to create $39^{th}$-order mel-frequency cepstral coefficients (MFCCs). And then cepstrum normalization and energy normalization may be applied.

Also, the speech recognition unit 120 plays a role of recognizing the received speech as a word sequence on the basis of the extracted feature vectors. Namely, the speech recognition unit 120 recognizes the feature vectors extracted from the received speech as word sequences having the maximum a posteriori probability. For example, the speech recognition unit 120 finds a word sequence W meeting a following condition.

$$W = \underset{W}{\mathrm{argmax}} P(W \mid Y) = \underset{W}{\mathrm{argmax}} P(Y \mid W) P(W)$$

Here, P(Y|W) denotes an acoustic model, and may predict a probability of feature vectors in a word sequence. P(W) denotes a language model, and describes a probability of the word sequence.

When separating the received speech as the recognized word sequence with reference to the feature vectors, the speech recognition unit 120 may refer to the acoustic model 310, a pronunciation dictionary 320 and a language model 330. The acoustic model 310 may be represented by a likelihood probability of the feature vectors for a given recognition unit. As the recognition unit used for consecutive speech recognition, a context-dependent triphone may be used so as to reflect context characteristics, or L-C+R may be used. Here, L denotes a left-context phoneme for a phoneme C, and R denotes a right-context phoneme for a right-context phoneme.

In addition, the pronunciation dictionary 320 is configured by listing standard pronunciation notation corresponding to a word as a sequence of a recognition unit. In order for the speech recognition unit 120 to recognize a word or a sentence, a word pronunciation dictionary formed of basic recognition units is needed. When obtaining P(W|W), a pronunciation sequence corresponding to a word W may be obtained by referring to the pronunciation dictionary, and likelihood values of the feature vectors may be obtained by using the acoustic model corresponding to the pronunciation sequence Furthermore, the language model 330 includes information representing association between neighboring words. The language model 330 may be used as a reference for the speech recognition unit 120 predicting a probability of a word sequence W, which is proper to a given recognition domain, thereby reducing a searching time and raising a recognition rate by limiting a word or a phrase unnecessary to perform speech recognition. That is, calculation of P(w) may performed by using the following equation.

$$P(W) = P(w_1 w_2 \ldots w_N) = P(w_1) P(w_2 \mid w_1) P(w_1 \mid w_2) \ldots P(w_N \mid w_1 \ldots w_{N-1}) \quad (1)$$

In addition, the phoneme WFST-based converting unit 130 plays a role of converting the recognized word sequence to phoneme WFST, and the error correcting unit 200 plays a role of correcting errors in the phoneme WFST. And elements forming the phoneme WFST-based converting unit 130 and the error correcting unit 200 will be described in detail with reference to FIG. 2.

Figure 2:
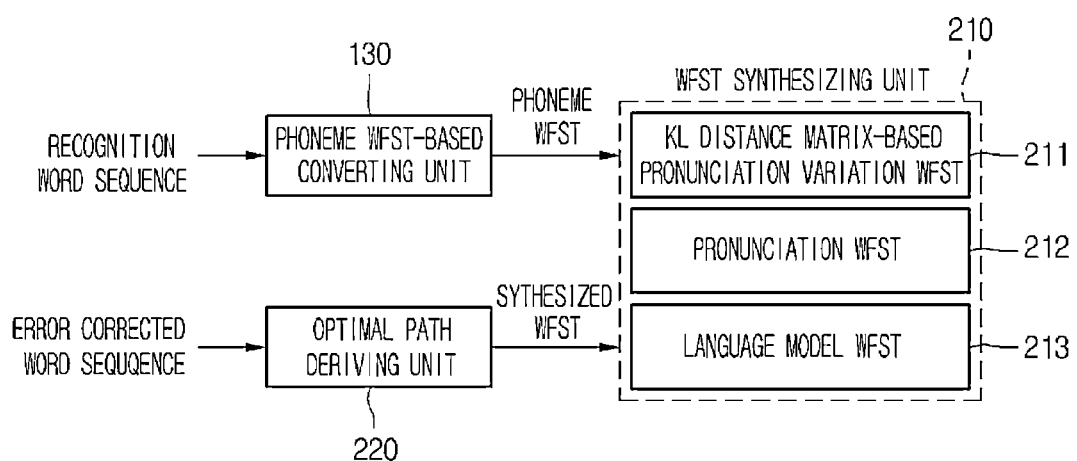
FIG. 2 illustrates a configuration of a device for correcting an error on the basis of weighted finite state transducers (WFST) in the apparatus for correcting an error in speech recognition according to embodiments.

FIG. 2 illustrates a configuration of a device for correcting an error on the basis of WFST in the apparatus for correcting an error in speech recognition.

Figure 4:
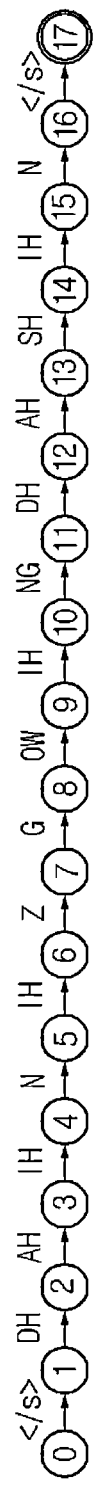
FIG. 4 illustrates an example of WFST-based conversion of a recognition word sequence to a phoneme sequence.

First, the phoneme WFST-based converting unit 130 performs WFST-based phoneme conversion for a recognition word sequence in order to increase accuracy of speech recognition. FIG. 4 illustrates an example of WFST-based conversion of the recognition word sequence into a phoneme sequence performed by the phoneme WFST-based converting unit 130.

For the received speech, when the recognized word sequence is "The Inn is Going the Shin", a phoneme sequence resulted from the WFST-based conversion may be configured as shown in FIG. 4.

Meanwhile, referring to FIG. 2, the speech recognition error correcting unit 200 of the embodiment includes a WFST-based synthesizing unit 210 and an optical path deriving unit 220. The WFST-based synthesizing unit 210 plays a role of performing WFST-based conversion on the data stored in the pronunciation model 340, the pronunciation dictionary 320, and the language model 330 and stores the converted results. And the WFST-based synthesizing unit 210 may include a KL distance matrix-based pronunciation variation WFST 211, a pronunciation dictionary WFST 212 and a language model WFST 213 as data converted by the WFST-based conversion. In particular, the WFST-based synthesizing unit 210 and the speech recognition error correcting unit 200 include an acoustic model adapting unit 410, a KL distance calculating unit 420 and a phoneme pronunciation variation model creating unit 430, which will be described later, in order to model KL distance matrix-based pronunciation variation.

Figure 6:
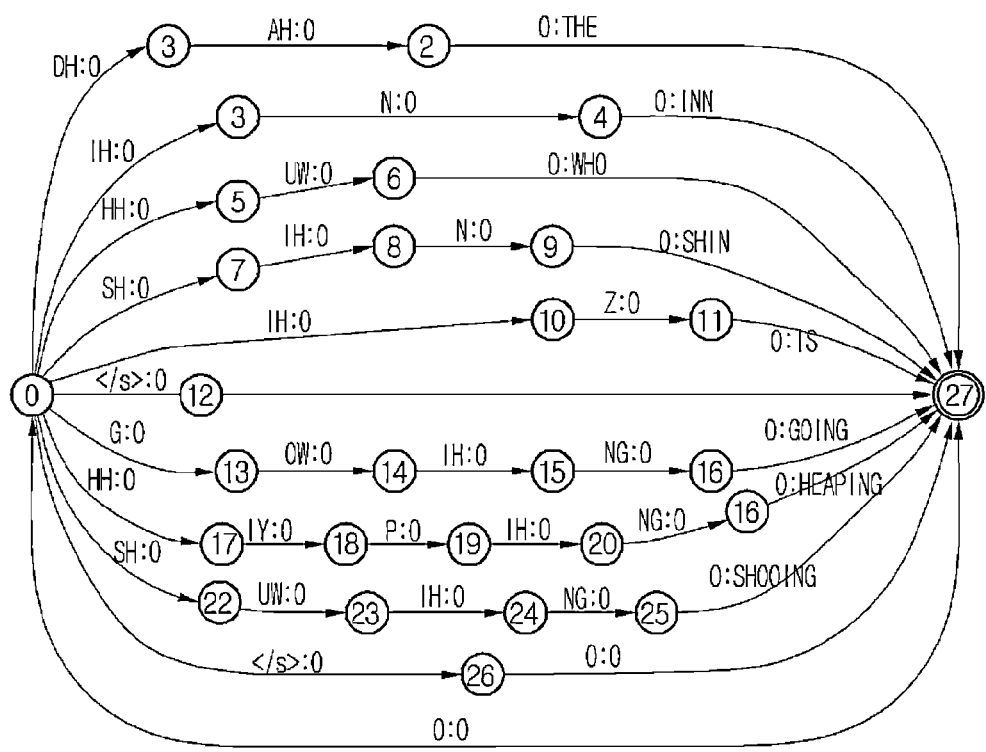
FIG. 6 illustrates an example of WFST built from a pronunciation dictionary.

In detail, the pronunciation dictionary WFST 212 plays a role of converting again a phoneme sequence into words existing in the pronunciation dictionary, where the phoneme sequence is a corresponding pronunciation sequence into which a recognition word sequence has been converted. When there is a phoneme sequence, 'DH AH', it is converted into 'THE', and creation of the pronunciation dictionary WFST may be performed by representing all the pronunciation sequences existing in the pronunciation dictionary 320 with connection loops between a start node and an end node. For example, a word 'The' is represented with nodes 1 and 2 between node 0 and node 17, and arcs. Here, the arc is marked with a pronunciation sequence and the last arc is written with the corresponding word. And DH:0 represents 0 as an output (namely, no output), when DH phoneme is input. When the entire 'DH AH' is input, 'The' is sent out as an output. FIG. 6 illustrates an example of the pronunciation WFST.

Figure 7:
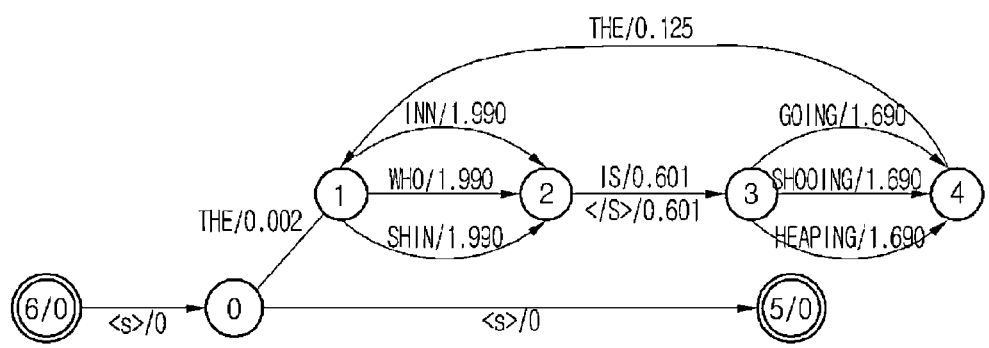
FIG. 7 illustrates an example of WFST built from a language model.

Meanwhile, for the word sequences, the language model WFST 213 precludes a less probabilistic word sequence and selects a higher probabilistic word sequence. For example, referring to FIG. 7, a probability of 'THE' to be next to <s>, which comes first in the beginning of a sentence, is 0.002. From the drawn arc, it may be known that 'THE' comes next to the beginning of the sentence, and a probability that 'INN' comes next to 'THE' is 1.990. That is, P(W) is represented in a graph format. FIG. 7 illustrates an example of the language model WFST.

The optical path deriving unit 220 plays a role of deriving a path having the smallest weight from among all possible paths (which are configured with word sequences where pronunciation variations are applied and re-synthesized) in a synthesized WFST. And the optimal path deriving unit 220 plays a role of deriving a path having the highest probability from among probabilities of paths which are configured with word sequences where pronunciation variations are applied and re-synthesized.

Figure 3:
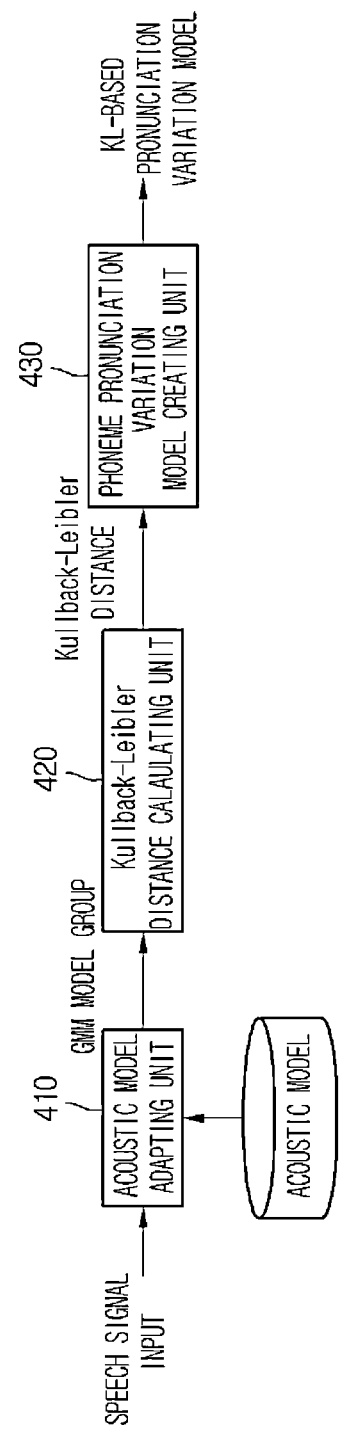
FIG. 3 illustrates a configuration of a device for modeling pronunciation variation in the apparatus for correcting an error in speech recognition according to embodiments.
Figure 5:
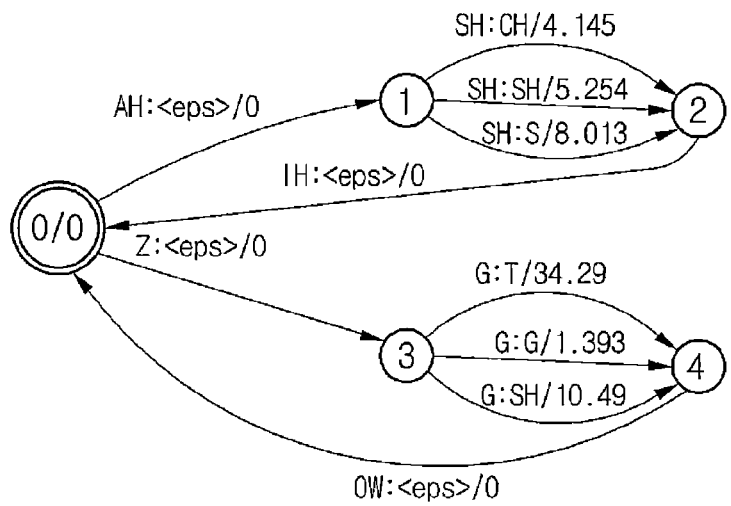
FIG. 5 illustrates an example of WFST built from KL distance matrix-based pronunciation variation.

Also, a KL distance matrix based pronunciation variation WFST 211 of the embodiment stores information converted by WFST-based conversion on the pronunciation variation model 340. A method of modeling pronunciation variation will be described in relation to FIG. 3. FIG. 3 illustrates a configuration of performing modeling of pronunciation variation in an apparatus for correcting a pronunciation error according to embodiment. For reference, FIG. 5 illustrates an example of a KL distance matrix-based pronunciation variation WFST.

Referring to FIG. 3, the pronunciation variation modeling is performed by an acoustic model adapting unit 410 for extracting a Gaussian mixture model (GMM) group from an input speech signal, a KL distance calculating unit 420 for calculating a KL distance from the GMM model group, and a phoneme pronunciation variation model creating unit 430 for creating a pronunciation variation model of phonemes on the basis of the KL distance.

The acoustic model adapting unit 410, the KL distance calculating unit 420, and the phoneme pronunciation variation model creating unit 430 may configure the WFST synthesizing unit 210, and will be described in detail.

The acoustic model adapting unit 410 plays a role of adapting an input speech signal to a specific speaker or an environment with reference to acoustic information stored in the acoustic model 310. For example, when the acoustic information stored in the acoustic model 310 is hidden Markov model (HMM) information created for a non-dysarthric speech, GMM models corresponding to middle states of all triphone acoustic HMMs may be extracted so as to adapt an acoustic model created with non-dysarthric speech to a dysarthric speech. In particular, in the present embodiment, since the GMM of a middle state of the HMM is used so as to calculate a KL distance matrix, it may be understood that the acoustic model adapting unit 410 extracts a GMM model group from an input speech signal.

In order to adapt the acoustic model of the HMM to a specific speaker or an environment, a mean and a variance of the Gaussian mixture HMM are linearly transformed by using a maximum likelihood linear regression (MLLR). An equation $\hat{\mu}=W\xi$ may be used where $\hat{\mu}$ is a mean adapted (linearly transformed) by the MLLR, $\xi=[w\ \mu_1\ ...\ \mu_n]$ is a mean vector of the GMM, and W is a linear transform matrix.

The KL distance calculating unit 420 plays a role of calculating KL distances between acoustic models by using the GMM model group, and, in particular, creating a KL distance matrix of the an acoustic model on the basis of triphones.

That is, by using the following equation 2, a KL distance matrix of a triphone-based acoustic model is created, and KL distances between GMMs of middle states of 3 left-to-right states of each acoustic model is calculated.

$$KL(L-C_i+R \| L-C_j+R) = \sum_{k=1}^{M} \omega_{i,k} KL(b_{i,k} \| b_{j,k}) + \sum_{k=1}^{M} \omega_{i,k} \log \frac{\omega_{i,k}}{\omega_{j,k}} \quad (2)$$

Here, $KL(L-C_i+R \| L-C_j+R)$ denotes a KL distance between triphones $L-C_i+R$ and $L-C_j+R$, and models pronunciation variation from $C_i$ to $C_j$, having phonemes L and R as left and right contexts.

In equation 2, $\omega_{i,k}$ denotes a mixture weight of a k-th Gaussian model of triphone $L-C_i+R$. Also, $KL(B_{i,k} \| b_{j,k})$ denotes a KL distance between k-th GMMs $b_{i,k}$ and $b_{j,k}$ of triphones $L-C_i+R$ and $L-C_j+R$, and may calculated by the following equation 3.

$$KL(b_{i,k} \| b_{j,k}) = \frac{1}{2}\left(\ln\left(\frac{|\Sigma_{j,k}|}{|\Sigma_{i,k}|}\right) + tr\left(\Sigma_{j,k}^{-1}\Sigma_{i,k}\right) + (\mu_{j,k}-\mu_{i,k})^T \Sigma_{j,k}^{-1}(\mu_{j,k}-\mu_{i,k}) - K\right) \quad (3)$$

Here, $\mu_{i,k}$ is a mean vector of k-th GMM of a triphone $L-C_i+R$, $\Sigma_{i,k}$ denotes a k-th covariance matrix of a triphone $L-C_i+R$, and K is a dimension of GMM, namely, a dimension of a feature vector.

The pronunciation variation may be modeled through the KL distance matrix between triphone acoustic models calculated from equation 2.

In detail, the KL distance may be referred to as similarity of a reference probability distribution P to an arbitrary probability distribution Q, and may be defined as the following equation 4.

$$KL(P \| Q) = \sum_{i} \ln\left(\frac{P(i)}{Q(i)}\right) P(i) \quad (4)$$

In addition, in the present embodiment, the distance matrix may be a phoneme confusion matrix. The phoneme confusion matrix represents what phoneme a reference phoneme is actually recognized to be, and represents a reference phoneme as a row, and a recognized phoneme as a column.

Modeling of pronunciation variation of a speech may be achieved by using equation 2, and errors in speech recognition may be accurately corrected.

According to the apparatus for correcting an error in speech recognition of the embodiment, correcting an error in speech recognition can be performed more accurately than ever.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for correcting errors in speech recognition, the apparatus comprising:

a feature vector extracting unit extracting feature vectors from a received speech;

a speech recognizing unit recognizing the received speech as a word sequence on the basis of the extracted feature vectors;

a phoneme weighted finite state transducer (WFST)-based converting unit converting the recognized word sequence recognized by the speech recognizing unit into a phoneme WFST; and a speech recognition error correcting unit correcting errors in the converted phoneme WFST, wherein the speech recognition error correcting unit comprises a WFST synthesizing unit modeling a phoneme WFST transferred from the phoneme WFST-based converting unit as pronunciation variation on the basis of a Kullback-Leibler (KL) distance matrix, and wherein the KL distance is calculated by an equation 1, $$KL(L-C_i+R \| L-C_j+R) = \sum_{k=1}^{M} \omega_{i,k} KL(b_{i,k} \| b_{j,k}) + \sum_{k=1}^{M} \omega_{i,k} \log \frac{\omega_{i,k}}{\omega_{j,k}}. \quad (1)$$

2. The apparatus according to claim 1, wherein the speech recognition error correcting unit further comprises a phoneme pronunciation variation model creating unit creating a phoneme confusion matrix by using the calculated KL distance.

3. The apparatus according to claim 1, wherein $KL(b_{i,k} \| b_{j,k})$ in the equation 1 is calculated by equation 2, $$KL(b_{i,k} \| b_{j,k}) = \frac{1}{2}\left(\ln\left(\frac{|\Sigma_{j,k}|}{|\Sigma_{i,k}|}\right) + tr\left(\sum_{j,k}^{-1} \sum_{i,k}\right) + (\mu_{j,k} - \mu_{i,k})^T \sum_{j,k}^{-1}(\mu_{j,k} - \mu_{i,k}) - K\right). \quad (2)$$

4. The apparatus according to claim 1, further comprising an acoustic model which is referred to when the speech recognizing unit separates the word sequence from the received speech,
wherein the acoustic model has information on a likelihood probability of the feature vectors for a phoneme of a recognition unit.

5. The apparatus according to claim 1, further comprising a pronunciation dictionary which is referred to when the speech recognizing unit recognizes the word sequence of the received speech,
wherein the pronunciation dictionary comprises information that standard pronunciation marks of words are listed in a sequence of a recognition unit.

6. The apparatus according to claim 5, wherein the WFST synthesizing unit further comprises a pronunciation dictionary WFST converting again a phoneme sequence into words existing in the pronunciation dictionary, wherein the phoneme sequence is a pronunciation sequence converted from a word sequence of a recognition target.

7. The apparatus according to claim 1, further comprising a language model which is referred to when the speech recognizing unit separates the word sequence from the received speech,
wherein the language model comprises association information between words so as to limit a specific word or a phrase when the word sequence is separated.

8. The apparatus according to claim 7, wherein the WFST synthesizing unit further comprises a language model WFST selectively precluding or selecting the word sequence from among recognition targets by using a probability included in the association information.

9. The apparatus according to claim 1, wherein a synthesized WFST output from the WFST synthesizing unit includes paths configured with word sequences where the pronunciation variations are applied and re-synthesized, and
wherein an optimal path deriving unit is further comprised which selects at least one of the paths by using a weight or a probability value of each of the paths.

* * * * *